May 4, 1943.   H. A. STRICKLAND, JR   2,318,023
WELDING APPARATUS
Original Filed Oct. 18, 1939   2 Sheets-Sheet 1
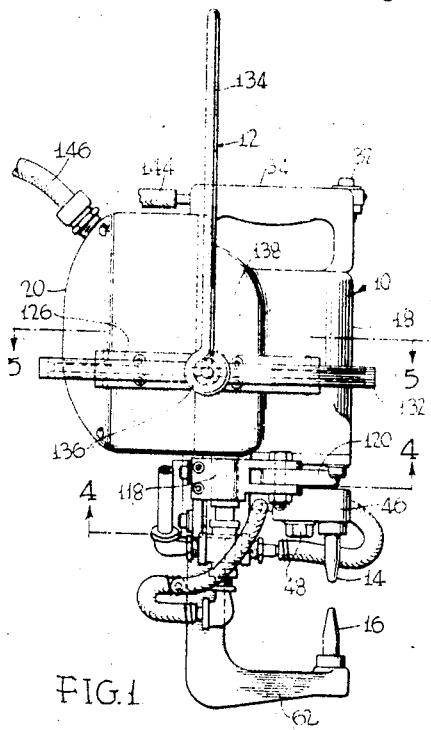
FIG.1
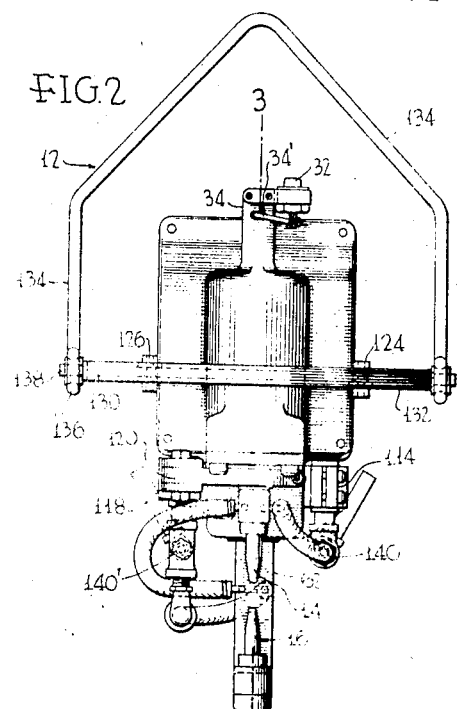
FIG.2
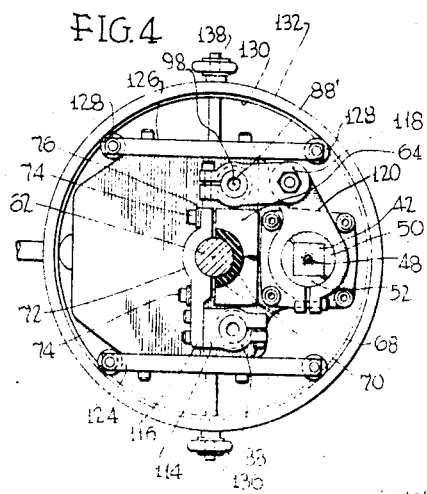
FIG.4
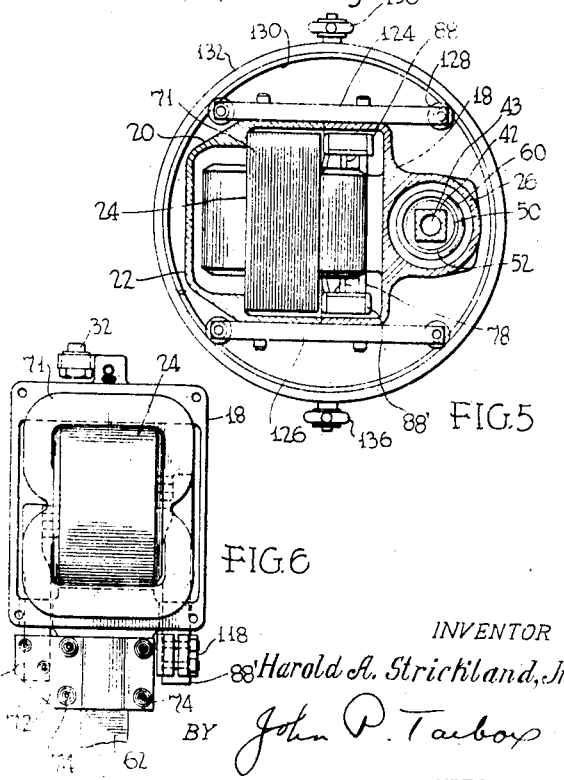
FIG.5
FIG.6
INVENTOR
Harold A. Strickland, Jr.
BY John P. Tarbox
ATTORNEY May 4, 1943.  H. A. STRICKLAND, JR  2,318,023
WELDING APPARATUS
Original Filed Oct. 18, 1939   2 Sheets-Sheet 2

INVENTOR
Harold A. Strickland, Jr.
BY John P. Tarbox
ATTORNEY

Patented May 4, 1943

2,318,023

UNITED STATES PATENT OFFICE 2,318,023

WELDING APPARATUS

Harold A. Strickland, Jr., Detroit, Mich., assignor to Budd Wheel Company, Philadelphia, Pa., a corporation of Pennsylvania Original application October 18, 1939, Serial No. 299,984. Divided and this application November 19, 1940, Serial No. 366,242

17 Claims. (Cl. 219—4)

This invention relates to resistance welding and more particularly to a portable spot welding apparatus in combination with an immediately adjacent transformer.

In welding apparatus of the portable type, and particularly for effecting welds in heavy material, the welding electrodes must be applied to the material under high pressure, and heavy currents of low voltage must be supplied to the electrodes. The use of air pressure in a fluid pressure motor forms the common source of pressure applied to the welding electrodes, and the fluid pressure to operate the motor is supplied through a relatively light flexible air hose. To supply electrical energy to the welding electrodes, a more serious situation results since the welding current is of low voltage and heavy amperage. In ordinary portable welding equipment, it is customary to have a stationary transformer connected to the portable welding gun through heavy conductors which are exceptionally cumbersome and in order to reduce their size, are generally water cooled.

To avoid the heavy cumbersome conductors which obviously impede the portability of the welding gun, the present invention is directed to the association of a transformer with a welding gun, the same being portable together. By such an arrangement, it is possible to supply the welding currents to the portable apparatus at high voltage through relatively small leads and avoid the necessity of water cooling the flexible conductors. Additionally, the size of the transformer may be as small as a half of that of the stationary transformer ordinarily used, due to the fact that line losses in the form of resistance and inductive reactance are substantially completely eliminated. Because of the reduced size of the transformer permissible as a result of the combination, the same becomes less cumbersome to handle than the former type of welding gun connected to a stationary transformer through portable leads and frequent replacement of such costly heavy leads due to continued flexing is avoided.

It is accordingly an object of this invention to provide a novel combination of portable welding gun and transformer.

Another object of the invention is to so associate a welding transformer with a welding gun that the transformer windings and connections to the gun are so short as to afford minimum losses.

A further object of the invention is to provide a combination transformer and welding gun in which the apparatus is conveniently balanced in a manner to afford easy handling.

Still another object of the invention is to provide a welding transformer having a secondary winding readily connectible to short leads adapted for connection to welding electrodes.

Still a further object of the invention is to provide a novel connection between water cooled secondary transformer conductors and a lead therefrom such that uniform distribution of water through the secondary conductors is assured and inspection readily possible.

Yet another object of the invention is to provide a support for a transformer welding gun combination such that the latter may be supported in balanced position and movement thereof may be effected with a minimum of effort.

Still another object of the invention is to provide an improved sliding heavy current connector to a reciprocating welding electrode carrying member.

The above and other novel features of the invention will appear more fully hereinafter from the following detailed description when taken in connection with the accompanying drawings. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 is a side elevation of a welding gun transformer combination and its support;

Fig. 2 is an elevational view of the welding gun transformer and its support from the front;

Fig. 4 is a transverse section taken substantially on the line 4—4 as illustrated in Figs. 3 and 1;

Fig. 5 is a section taken substantially on the line 5—5 of Fig. 1;

Fig. 6 is an elevational view of the upper portion of the combination, taken from the back of the combination, illustrating the position and arrangement of the transformer, the back section of the casing being removed for this purpose.

Figure 3:
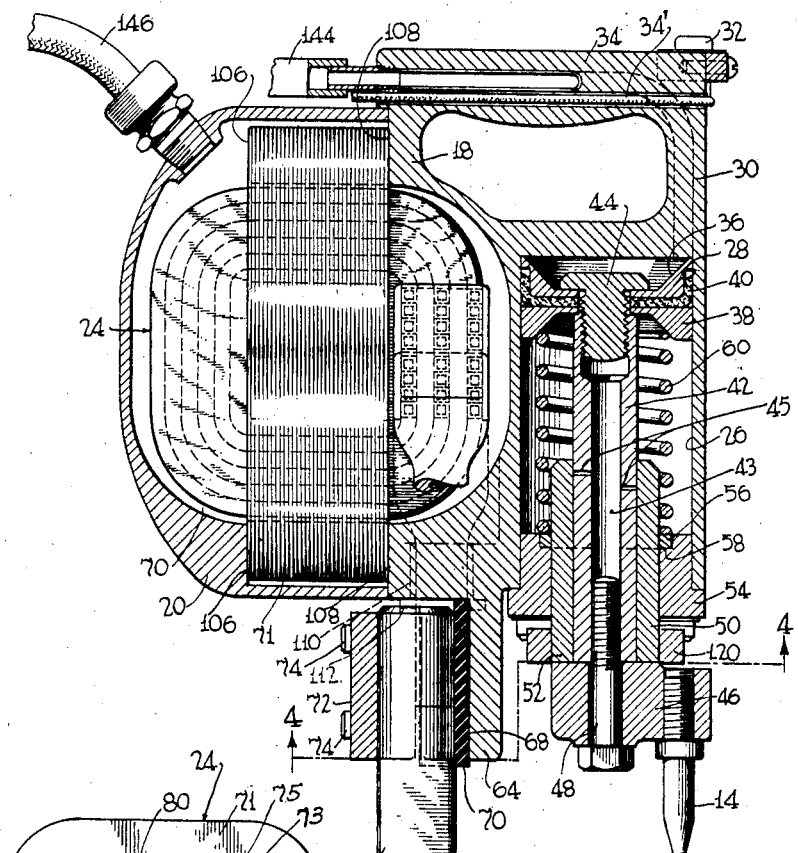
Fig. 3 is an enlarged longitudinal section taken substantially on the line 3—3 of Fig. 2.

Referring to Fig. 1, there is illustrated a combination welding gun and transformer, the same having a casing 10, a support generally indicated as at 12 and welding electrodes 14 and 16. Casing 10 may be formed of complementary sections 18 and 20 as especially shown in Figs. 3 and 5, the sections together forming a cavity of suitable shape for closely and compactly housing the transformer 24. One of the casing members, 18, has integrally formed therein a fluid pressure cylinder 26 arranged at one side of the transformer cavity and which cylinder is adapted to actuate the welding electrode 14 and engage the same under pressure against the work pieces in which welds are to be effected.

The cylinder 26 contains a reciprocating piston 28 adapted to be forced downward by air pressure entering the top of the cylinder through the port 30, it being understood that air pressure supplied to the cylinder may be conveniently controlled from a control button 32 conveniently located with respect to the handle 34 arranged adjacent the upper end of the fluid pressure cylinder. The piston 28 is composed of members 36 and 38 between which is a leather washer 40, the members 36 and 38 and the washer 40 being clamped together upon the end of a piston rod 42 through a bolt 44 threaded in the end of the rod.

The piston rod at its lower end projects from the cylinder and carries the welding electrode 14, the electrode being carried in an offset block 46 secured against the lower end of the piston rod by a central bolt 48. By offsetting the welding electrode from the central axis of the cylinder a bending moment is placed upon the piston rod and assurance is thereby had that the piston rod and piston will make good electrical connection with the cylinder.

In order to prevent relative rotation of the piston rod 42 and the cylinder 26 and provide good electrical contact to the piston rod, the piston rod is square throughout its length and slides through a pair of contact blocks 50 and 52 forming a split sleeve secured to and extending through the end closure member 54 of the cylinder.

The blocks together form a split square aperture through which the piston rod may reciprocate and are provided with an annular external shoulder 56 which is adapted to seat in an annular groove 58 on the inside of the end closure member 54. The blocks are held in position with their shoulders 56 seated in the annular recess 58 by a heavy return spring 60 one end of which bears against the shoulders 56 and the other end of which bears against the piston member 38.

To provide adequate lubrication between the rod 42 and the blocks 50 and 52, the rod is bored thruout its length as at 43, and transverse ports 45 provided extending from the hollow 43 to the rod surface. By filling the hollow with grease or lubricant, and plugging the hollow at either end by the bolts 44 and 48, adequate lubrication effective over long periods is provided.

The lower electrode 16 is supported upon an arm 62 which is clamped in position against a depending tongue 64 forming an integral part of the cylinder casing section 18. To insulate the electrode, the shank 66 of the arm 62 is clamped in a semi-cylindrical recess 68 of the extension portion 64, a semi-cylindrical layer of insulation 70 being provided to electrically insulate the shank 66 from the extension 64. A clamping member 72 is adapted to bear upon the opposite side of the shank from the extension in which it is secured and the clamping member is held in position under pressure by bolts 74 threaded in the extension member, the bolts however being insulated from the clamping member by insulating washers 76 and suitable sleeves around the shank thereof (not shown).

Figure 7:
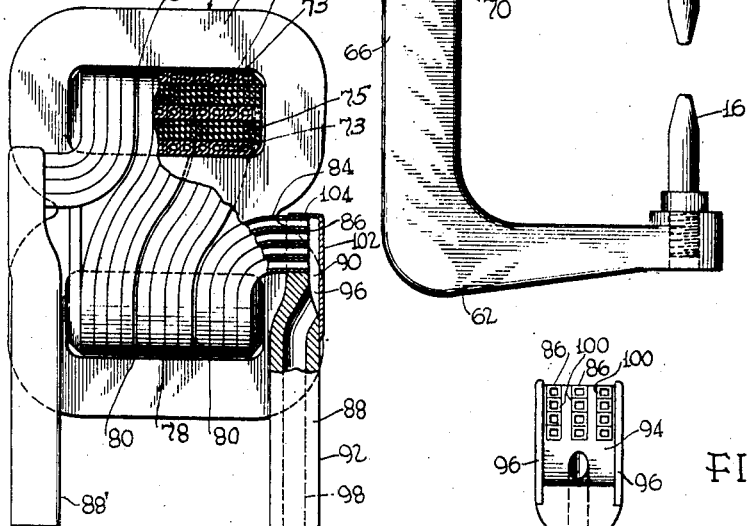
Fig. 7 is an enlarged elevational view of the transformer with portions thereof broken away to illustrate the connections and winding.
Figure 8:
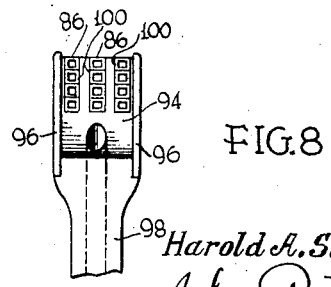
Fig. 8 is a detail view of the connection illustrated in Fig. 7 with the cover plate removed.

The transformer arranged in the recess 70 formed by the sections 18 and 20 of the casing is provided with a core 71 having an 8 configuration, and a secondary winding 73 arranged in three layers intermediately spaced by primary windings 75. Each secondary layer comprises approximately three turns composed of a conductor made up of four hollow tubes laid side by side as is best illustrated in Fig. 7. The individual tubes 78 of the conductor may preferably be square as illustrated in contact with one another and between conductors a thin strip of insulation 80 is provided to separate the turns from adjacent turns. Because it is desirable to use as small a transformer as possible under the present circumstances, it is necessary that the transformer be water cooled and particularly the secondary thereof, but where there are numerous parallel conductors, each requiring water cooling, for best efficiency, it is necessary that the fluid be distributed equally among the various tubes of the conductors. In order to assure such uniform distribution of cooling fluid, the conductors at the ends of the turns are given a right angle bend as at 84, and the conductor ends 86 of the various layers are led into terminal connectors 88 and 88' having a cooling fluid distributing chamber 90 adjacent the ends of the conductor tubes. Each terminal connector has a cylindrical portion 92 and a flattened end portion 94 provided with side flanges 96 to form the chamber 90 and the cylindrical shank portion 92 has a central bore 98 therethrough leading into the chamber 90. To secure the conductors to the terminal connector, the flat portion may be slotted as at 100 and the square conductors of each layer laid in the slot and silver soldered or otherwise secured in the slot and thereafter in order to complete the chamber a cover plate 102 having an end flange 104 may be soldered to the flanges 96 of the end of the connector bar and thus provide the closed distributing chamber 90 from which all conductors may receive an equal amount of cooling fluid at a uniform pressure. By soft soldering this plate in place, ready inspection can be had by quickly removing and replacing the plate, and thus the individual tubular conductors can be checked as against possible constriction or clogging.

By distributing the secondary windings in a plurality of interleaving layers of the primary not only are the inductive reactance losses of the transformer reduced, but adequate cooling of the primary afforded without directly supplying the same with coolant.

The transformer core may be clamped between the shoulders 106 and 108 formed by the casing members and the terminal connectors 88, 88', may pass out of the casing section 18 through apertures 110, insulating bushings 112 being provided. It will be observed in Fig. 7 that the left hand terminal connector 88' extends further into the transformer aperture than the right hand terminal conductor in order to accommodate the offset in the ends of the secondary windings, and it will be also observed that the terminal conductors nest or lie in a space which would otherwise be wasted in the usual transformer construction.

Connections from the terminal connectors 88 and 88' are best illustrated in Fig. 4 wherein a connection from the terminal connector 88 to the lower electrode and its supporting arm 62 is completed in an expeditious manner through the clamp 114 which in turn is electrically connected to the adjacent clamping member or plate 72 through an extension 116 thereof. The other terminal 88' is connected through a clamp member 118 embracing the terminal connector and which is in turn electrically connected to a second clamped member 120 which embraces the sleeve blocks 50 and 52 to make connection with the piston rod and the upper electrode 14. The clamp 120 may be adjusted to provide any desired pressure upon the blocks 50, 52 to assure good electrical contact to the piston rod and in practice, because of the broad area and the planar surfaces with which electrical contact is made, it will be found that no extreme pressures are required for sufficient electrical contact.

While most of the parts are preferably made of light material, except where electrical conduction is concerned, in which case copper alloys are employed, the transformer itself having a considerable quantity of iron therein adds considerable weight to the apparatus. In order to faciltiate use of the apparatus, a novel suspension is provided. To either side of the casing are positioned bars 124 and 126 having grooved roller 128 in the ends thereof adapted to roll upon an annular internal ridge 130 of a supporting ring 132 and the supporting ring is in turn pivotally hung from a yoke 134, the yoke being provided with eyes 136 embracing trunnions 138 integral with the ring 132. The axis of the trunnions 138 is designed so as to pass substantially through the center of gravity of the combined welding gun and transformer but preferably the axis is located slightly above by an amount just sufficient to cause the apparatus to normally take the position shown in Fig. 1. By supporting the gun from a counterbalanced cable, it will appear that the same may be readily shifted about to engage the work at various angles, the assembly being rotatable within the ring and angularly movable as a result of the trunnion support and because of the substantial balance of the apparatus but a small amount of effort is required to place the gun in any desired position.

To supply water cooling to the transformer, hose connections are made to the shank ends of the terminal connectors 88 and 88' as is shown in Fig. 2, at 140 and 140', and various other cooling connections may be made for example to the offset block 46 and the arm 62 for cooling hollow spaces such as may be formed therein as is well understood in the art. The only flexible connections therefore necessary to the gun are the water cooling connections, the air connection 144, and the extremely flexible cable 146 supplying a high voltage for the primary of the transformer and such other control connections as may be found desirable. In practice, a control button 32 may be electrically connected thru a wire 34' to a valve in the air pressure line remote from the welding gun and adjacent the source of supply and the welding current may be caused to flow as a result of pressure built up in the cylinder 26, a pressure switch being used for this purpose as is likewise well understood in the art.

It will thus appear that there is provided a transformer and welding gun combination which is relatively light in weight, assures efficient operation and which is highly portable. Additionally, such flexible connections as are required are relatively light and form a minimum impediment to the portability of the apparatus. Because of the relative closeness of the transformer to the gun, and extreme shortness of the leads, great efficiency is obtained and because of the novel arrangement thereof, space and weight has been conserved and a compact, well balanced, easily handled apparatus provided.

Though a single embodiment of the invention has been illustrated and described, it is to be understood that the invention is not limited thereto but may embody any various other mechanical and electrical forms. As many changes in the construction and arrangement of the parts may be made without departing from the spirit of the invention, as will be apparent to those skilled in the art, reference will be had to the appended claims for a definition of the limits of the invention.

Claims to the transformer and its details for cooling are described and claimed in my copending application, Serial No. 299,984, filed October 18, 1939, for Welding apparatus, of which this application is a division.

What is claimed is:

1. In a welding apparatus, a casing, a transformer arranged in said casing, a fluid pressure cylinder arranged in a part of said casing, said transformer having a core the laminations of which lie substantially in a plane parallel to the axis of said fluid pressure cylinder and said transformer having a winding wound about an axis transverse to said fluid pressure cylinder axis, said transformer and cylinder lying substantially side by side and in close proximity to one another, a piston in said cylinder, an electrode connected to said piston so as to be moved thereby to and from said first electrode, a second electrode substantially aligned with said first-named electrode supported by said casing, and terminal connections to said transformer on opposite sides of the winding extending substantially parallel to the axis of said cylinder and in a space between the said cylinder and transformer and electrode connections extending from said terminal connections to said electrodes.

2. In a welding apparatus, a fluid pressure cylinder, a piston reciprocable therein, a non-circular cross-sectioned piston rod secured to said piston, an end enclosure member for said cylinder having an aperture therein in which said rod may reciprocate, a welding electrode carried by said rod, an electrical contact sleeve arranged around said rod and adapted for surface engagement with its non-circular contour and in the aperture of said end enclosure member, said contact member having a shoulder bearing against said end enclosure member for securing it in position axially with respect to the said rod, and yieldable means cooperating with said piston and shoulder for retaining said contact in place against said end closure member.

3. In a welding apparatus, a casing comprising a main section and a cover section together forming a space for receiving a welding transformer, a welding transformer including a core in said space, means for securing said transformer in position by clamping said sections together against said core, a cylinder on said main section having a reciprocable piston and piston rod, said cylinder being arranged along one side of said transformer, said piston rod being operatively connected to a welding electrode, a second welding electrode insulatingly supported from said main section, connections from said transformer to said welding electrodes, and a handle provided on said main section adjacent the end of the cylinder and to one side of said transformer.

4. In a welding apparatus, a casing comprising a main section and a cover section together forming a space for receiving a welding transformer, a welding transformer including a core in said space, means for securing said transformer in position by clamping said sections together against said core, a cylinder in said main section having a reciprocable piston and piston rod, said cylinder being arranged along one side of said transformer, said piston rod having a welding electrode carried thereby, a second welding electrode insulatingly supported from said main section, and connections from said transformer to said welding electrodes.

5. In a welding apparatus, a fluid pressure cylinder, a piston reciprocable therein, a non-circular sectioned piston rod secured to said piston and emerging from one end of said cylinder, a welding electrode carried by said piston rod, an end enclosure for said cylinder having an aperture therein through which said piston rod reciprocates, an annular recess on said end enclosure member on the inside thereof, a sleeve for engaging said piston rod and its non-circular contour and extending through the aperture of said end enclosure member and having a shoulder adapted to be received in said recess, and resilient means surrounding said piston rod and compressed between said piston and said shoulder to hold said sleeve in position.

6. In a welding apparatus, a fluid pressure cylinder, a piston reciprocable therein, a non-circular sectioned piston rod secured to said piston and emerging from one end of said cylinder, a welding electrode carried by said piston rod, an end enclosure for said cylinder having an aperture therein through which said piston rod reciprorates, an axially split sleeve means for engaging said piston rod and its non-circular contour and extending through the aperture of said end enclosure member and having a shoulder adapted to bear against the inside of said enclosure member and resilient means surrounding said piston rod and compressed between said piston and said shoulder to hold said sleeve means in position.

7. In a welding apparatus, a casing, a transformer, and a fluid pressure cylinder arranged side by side therein, a piston reciprocable in the cylinder, a non-circular sectioned piston rod secured to said piston and emerging from one end of said cylinder, a welding electrode carried by said piston rod, an end enclosure for said cylinder having an aperture therein through which said piston rod reciprocates, an axially split sleeve for engaging said piston rod and its non-circular contour and extending through the aperture of said end enclosure member and having a shoulder adapted to be received against the inside of said enclosure member, resilient means surrounding said piston rod and compressed between said piston and said shoulder to hold said sleeve in position and retract said electrode, a second electrode carried by said casing, connections from said transformer to said electrodes including a clamp connection embracing said sleeve and adjustable as to embracing pressure upon said sleeve.

8. In a welding apparatus, a casing, a transformer, and a fluid pressure cylinder arranged side by side therein, a piston reciprocable therein, a non-circular sectioned piston rod secured to said piston and emerging from one end of said cylinder, a welding electrode carried by said piston rod, an end enclosure for said cylinder having an aperture therein through which said piston rod reciprocates, a split sleeve for engaging said piston rod and its non-circular contour extending through the aperture of said end enclosure member and having a shoulder adapted to be received in said aperture, a second electrode carried by said casing, connections from said transformer to said electrodes including a clamp around said sleeve and adapted to adjustably embrace said sleeve.

9. A welder comprising electrodes, a transformer for supplying current to said electrodes, a device comprising a stationary and a movable part for applying pressure to said electrodes, the axis of said device being located centrally of said transformer on one side thereof and axially overlapping it to a substantial extent, a casing enclosing said transformer and being rigidly connected to said stationary part of the said device, and substantially rigid secondary leads from said transformer extending longitudinally of said device within and through said casing and located adjacent opposite sides of said casing on opposite sides of said device and on opposite sides of the windings of said transformer.

10. In a welding apparatus of the type having welding electrodes, a transformer supplying said electrodes, a cylinder and piston for applying pressure to said electrodes, connections from the secondary of said transformer to at least one of said electrodes, the improvement for shortening said connections which includes the cylinder and transformer being contiguous in a common rigid structure in which each overlaps the other both laterally and longitudinally of the cylinder, said connections including substantially rigid bars located within the casing on opposite sides of the transformer winding and longitudinally of the cylinder and lateral connecting means between said bars and said electrodes.

11. In a welding apparatus of the type having welding electrodes, a transformer supplying said electrodes, a cylinder and piston for applying pressure to said electrodes, substantially rigid connections from the secondary of said transformer to said electrodes, the improvement for shortening said connections which includes the cylinder and transformer being contiguous within a common casing in which each overlaps the other both laterally and longitudinally of the cylinder, said connections including bars located within the casing on opposite sides of the transformer winding and extending parallel to the cylinder axis, and lateral connections from said bars to said electrodes, one of said electrodes being stationary and the other movable by its attachment to the rod of said piston, the connection from one of said bars to the movable electrode comprising said piston rod and a conductor block attached to the respective bar and slidingly engaged by said piston rod, the axis of said electrodes being eccentric to the axis of said piston rod so that pressure between the electrodes tends to flex said piston rod with respect to said block so as to increase the pressure and thereby the electrical contact between said rod and block.

12. In a welding machine; a first electrode and a second electrode; a transformer; motor means comprising a first member and a second member, the second member being reciprocable with respect to said first member in the direction of the common axis of both members; said transformer and said first member being arranged and connected to each other side by side in close proximity to each other, the axis of said first member extending parallel to a plane extending between said first member and said transformer; said first electrode being substantially stationarily supported by the unit constituted by said transformer and said first member; said second electrode being connected to said second member so as to be moved thereby to and from said first electrode; said electrodes being arranged in a region adjoining one side of the aforesaid unit which side is formed in common by said transformer and first member.

13. In a welding machine; a first electrode and a second electrode; a transformer comprising a core and windings wound about parts of said core; motor means comprising a first member and a second member, the two members being relatively reciprocable in the direction of their common axis; said transformer and said first member being arranged and connected to each other side by side in close proximity to each other; the axis of said first member extending parallel to a plane extending between said first member and said transformer; said transformer being arranged with its core in a plane parallel to and spaced from the axis of said members; said first electrode being substantially stationarily supported by the unit constituted by said transformer and said first member; said second electrode being connected to said second member so as to be moved thereby to and from said first electrode; said electrodes being arranged in a region extending from said transformer and first member unit in the general direction of the axis of said members.

14. In a welding machine; a first electrode and a second electrode; a transformer comprising a core and windings wound about parts of said core; motor means comprising a first member and a second member, the two members being relatively reciprocable in the direction of their common axis; said transformer and said first member being arranged and connected to each other side by side in close proximity to each other; the axis of said first member extending parallel to a plane extending between said first member and said transformer; said transformer being arranged with its core in a plane parallel to and spaced from the axis of said members and with the axis of its core transversely to the axis of said members; said first electrode being substantially stationarily supported by the unit constituted by said transformer and said first member; said second electrode being connected to said second member so as to be moved thereby to and from said first electrode; said electrodes being arranged in a region extending from said transformer and first member unit in the general direction of the axis of said members.

15. In a welding apparatus, a casing comprising a main section and a cover section, together forming a space for receiving a welding transformer; a welding transformer including a core in said space; means for securing said transformer in position by clamping said sections together against said core; a cylinder on said main section having a reciprocable piston and piston rod, said cylinder being arranged along one side of said transformer; said piston rod being operatively connected to a welding electrode so that movement of the former is imparted to the latter; means supported by said main section for guiding said electrode; a second welding electrode supported from said main section; and connections from said transformer to said welding electrodes.

16. In a welding machine; a first electrode and a second electrode; a transformer comprising a core and windings wound about parts of said core; motor means comprising a first member and a second member, the two members being relatively reciprocable in the direction of their common axis; said transformer and said first member being arranged and connected to each other side by side in close proximity to each other; the axis of said first member extending parallel to a plane extending between said first member and said transformer; said transformer being arranged with its core in a plane parallel to and spaced from the axis of said members; said first electrode being substantially stationarily supported by the unit constituted by said transformer and said first member; said second electrode being operatively connected to said second member; means on said unit adapted for guiding said second electrode; said electrodes being arranged in a region extending from said transformer and first member unit in the general direction of the axis of said members.

17. In a welding machine; a first electrode and a second electrode; a transformer comprising a core and windings wound about parts of said core; motor means comprising a first member and a second member, the two members being relatively reciprocable in the direction of their common axis; said transformer and said first member being arranged and connected to each other side by side in close proximity to each other; the axis of said first member extending parallel to a plane extending between said first member and said transformer; said transformer being arranged with its core in a plane parallel to and spaced from the axis of said members and with the axis of its core transversely to the axis of said members; said first electrode being substantially stationarily supported by the unit constituted by said transformer and said first member; said second electrode being operatively connected to said second member; guiding means for said second electrode supported by said unit; said electrodes being arranged in a region extending from said transformer and first member unit in the general direction of the axis of said members.

HAROLD A. STRICKLAND, Jr.